United States Patent
Luo et al.

(10) Patent No.: US 11,490,340 B2
(45) Date of Patent: Nov. 1, 2022

(54) SETTING DIRECTIONAL OR NON-DIRECTIONAL ANTENNA MODE BASED ON TRANSMISSION POWER

(71) Applicant: Nokia Solutions and Networks Oy, Espoo (FI)

(72) Inventors: Zhe Luo, Shanghai (CN); Tao Tao, Shanghai (CN); Jianguo Liu, Shanghai (CN); Gang Shen, Shanghai (CN); Jun Wang, Shanghai (CN); Zhuo Wu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 32 days.

(21) Appl. No.: 16/969,039

(22) PCT Filed: Mar. 14, 2018

(86) PCT No.: PCT/CN2018/078955
§ 371 (c)(1),
(2) Date: Aug. 11, 2020

(87) PCT Pub. No.: WO2019/173983
PCT Pub. Date: Sep. 19, 2019

(65) Prior Publication Data
US 2021/0377880 A1  Dec. 2, 2021

(51) Int. Cl.
*H04W 52/24* (2009.01)
*H04W 52/50* (2009.01)
*H04B 7/0408* (2017.01)

(52) U.S. Cl.
CPC .......... *H04W 52/50* (2013.01); *H04B 7/0408* (2013.01); *H04W 52/242* (2013.01)

(58) Field of Classification Search
CPC . H04W 52/50; H04W 52/242; H04W 52/325; H04W 52/408; H04W 52/32;
(Continued)

(56) References Cited

U.S. PATENT DOCUMENTS

2005/0285803 A1* 12/2005 Lacono ................ H04B 7/0695
                                                    343/702
2008/0085738 A1    4/2008 Li et al.
(Continued)

FOREIGN PATENT DOCUMENTS

CN        103986508 A        8/2014
CN        106960557 A        7/2017
(Continued)

OTHER PUBLICATIONS

European Office Action dated Sep. 30, 2021 issued in corresponding European Appln. No. 18910121.5.
(Continued)

*Primary Examiner* — Philip Sobutka
(74) *Attorney, Agent, or Firm* — Harness, Dickey & Pierce, P.L.C.

(57) ABSTRACT

Embodiments of the disclosure provide a method, device and computer readable medium for transmission scheme. According to embodiments of the present disclosure, the communication device may transmit an initial message to a further communication device via an antenna in an omnidirectional mode if the transmitting power can be achieved by the antenna in the omnidirectional mode. The communication device may transmit the initial message to the further communication device via the antenna in a directional mode if the transmitting power cannot be achieved by the antenna in the omnidirectional mode. In this way, latency for initializing the connection may be reduced and the successful connections are guaranteed at the same time.

17 Claims, 5 Drawing Sheets

(58) Field of Classification Search
CPC ...... H04B 7/0408; H04B 7/1555; H04B 7/02; H04B 7/04; H04B 7/0608; H04B 7/0602; H04B 7/0604; H04B 7/0817; H04B 7/982
See application file for complete search history.

(56) References Cited

U.S. PATENT DOCUMENTS

| | | |
|---|---|---|
| 2014/0016573 A1 | 1/2014 | Nuggehalli et al. |
| 2015/0084829 A1 | 3/2015 | Jenwatanavet et al. |
| 2016/0043792 A1 | 2/2016 | Jeong et al. |
| 2016/0066197 A1 | 3/2016 | Park et al. |
| 2017/0289921 A1* | 10/2017 | Kim .................. H04W 72/0473 |
| 2017/0373739 A1 | 12/2017 | Guo et al. |

FOREIGN PATENT DOCUMENTS

| | | |
|---|---|---|
| JP | 4564530 B2 | 10/2010 |
| WO | WO-2008/045844 A1 | 4/2008 |
| WO | WO-2014126773 A1 | 8/2014 |
| WO | WO-2017/026813 A1 | 2/2017 |

OTHER PUBLICATIONS

International Search Report PCT/ISA/210 for International Application No. PCT/CN2018/078955 dated Aug. 29, 2018.
CA Examination Report dated Dec. 6, 2021 in Indian Application No. 202047044007.

* cited by examiner

SETTING DIRECTIONAL OR NON-DIRECTIONAL ANTENNA MODE BASED ON TRANSMISSION POWER

CROSS-REFERENCE TO RELATED APPLICATIONS

This application is a national phase under 35 U.S.C. § 371 of PCT International Application No. PCT/CN2018/078955 which has an International filing date of Mar. 14, 2018, the entire contents of each of which are hereby incorporated by reference.

FIELD

Embodiments of the present disclosure generally relate to communication techniques, and more particularly, to methods, devices and computer readable medium for transmission scheme.

BACKGROUND

In some communication systems, if a communication device (for example, a terminal device) initiates a connection with a further communication device (for example, a network device and/or a further terminal device), the communication device may transmit an initial message to the further terminal device. The communication device may often transmit the initial message using a directional antenna. However, the communication device may not select the best direction for transmitting at the beginning. It will cost long time to adjust the transmitting direction to be the best direction. Therefore, further research is still needed.

SUMMARY

In general, embodiments of the present disclosure relate to a method for authenticating terminal devices and the corresponding network device and terminal device.

In a first aspect, embodiments of the present disclosure provide a method implemented at a communication device for communication. The method comprises: determining a first power for transmitting a signal to a further communication device; determining, based on the first power and a threshold power, a mode of an antenna of the communication device from an omnidirectional mode and a directional mode, the threshold power being predefined for the omnidirectional mode of the antenna; and transmitting, to the further communication device, the signal via the antenna in the determined mode using the first power.

In a second aspect, embodiments of the disclosure provide a communication device. The network device comprises: an antenna; at least one processor; and a memory coupled to the at least one processor, the memory storing instructions therein, the instructions, when executed by the at least one processor, causing the network device to perform acts including: determining a first power for transmitting a signal to a further communication device; determining, based on the first power and a threshold power, a mode of the antenna of the communication device from an omnidirectional mode and a directional mode, the threshold power being predefined for the omnidirectional mode of the antenna; and transmitting, to the further communication device, the signal via the antenna in the determined mode using the first power.

In a third aspect, embodiments of the disclosure provide a computer readable medium. The further computer readable medium stores instructions thereon, the instructions, when executed by at least one processing unit of a machine, causing the machine to implement the method according the second aspect of the present disclosure Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Some example embodiments will now be described with reference to the accompanying drawings, where.

Throughout the figures, same or similar reference numbers indicate same or similar elements.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. The term "below" used herein means being smaller or equal.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "communication device" used herein may refer to a network device or a terminal device. The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "omnidirectional mode" used herein comprises, but not limited to, "full-omnidirectional mode" and "semi-omnidirectional mode."

As described above, in some communication systems, a communication device may transmit an initial message to a further communication device to establish the connection. For example, in the New Radio (NR) system, the network device broadcasts information related to uplink resources in different directions. The terminal device may transmit the initial message in a direction based on the broadcasted information. Only if the initial message is transmitted in the correct direction, the network device is able to receive the initial message. Since the network device broadcasts the information periodically, the terminal device may adjust the transmitting direction or transmitting power accordingly.

In some situations, the terminal device and the network device may perform unlicensed communication. In the unlicensed communication, the network device may not be able to transmit the information periodically due to a listen-before-talk (LBT) mechanism. In such situations, it may take very long time for the terminal device to adjust the direction or power, which extremely increases the latency for the connection.

In order to at least in part solve above and other potential problems, Embodiments of the present disclosure provide a solution for determining a transmitting mode for an antenna of communication devices. Generally speaking, according to embodiments of the present disclosure, the communication device may determine a transmitting mode based on a transmitting power. The communication device may prefer an omnidirectional mode if the transmitting power does not exceed a threshold associated with the omnidirectional mode. In this way, latency for initializing the connection may be reduced and the successful connections are guaranteed at the same time.

Now some example embodiments of the present disclosure are described below with reference to the figures. Those skilled in the art would readily appreciate that the detailed description given herein with respect to these figures is for explanatory purpose as the present disclosure extends beyond theses limited embodiments.

Figure 1:
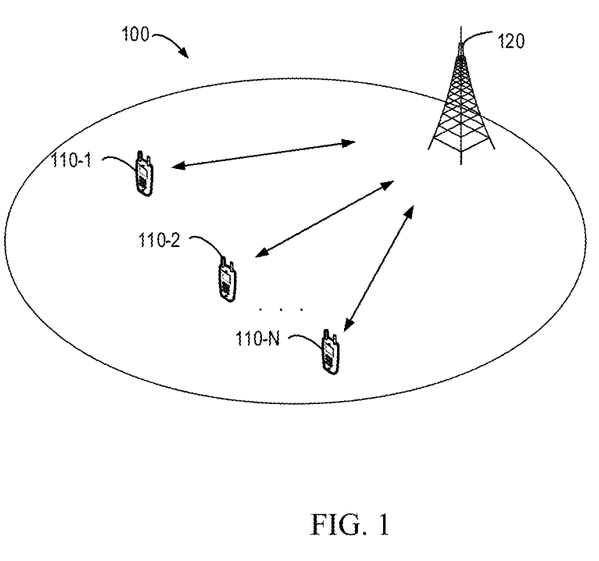
FIG. 1 illustrates a schematic diagram of a communication system according to embodiments of the present disclosure.

FIG. 1 illustrates a schematic diagram of a communication system 100 in which embodiments of the present disclosure can be implemented. The communication system 100, which is a part of a communication network, comprises a network device 120 and terminal devices 110-1, 110-2, ..., and 110-N, which can be collectively referred to as "terminal device(s)" 110. It is to be understood that the number of network devices and terminal devices shown in FIG. 1 is given for the purpose of illustration without suggesting any limitations. The communication system 100 may comprise any suitable number of network devices and terminal devices. It should be noted that the communication system 100 may also comprise other elements which are omitted for the purpose of clarity. The network device 120 may communicate with the terminal devices 110.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
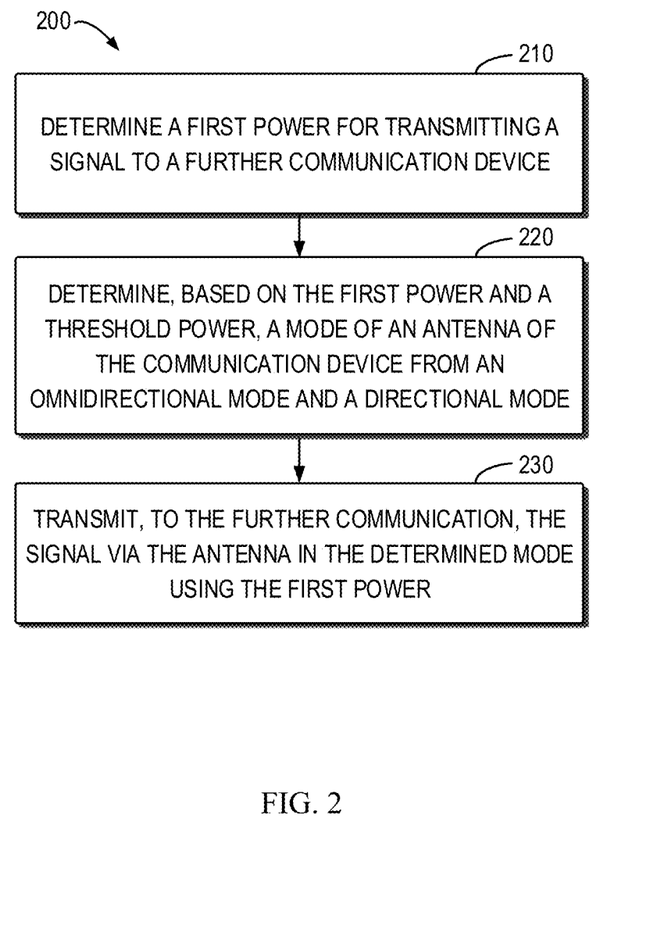
FIG. 2 illustrates a flowchart of a method implemented at a communication device for communications according to embodiments of the present disclosure.

FIG. 2 illustrates a flowchart of a method 200 implemented at a communication device for communications according to embodiments of the present disclosure. It should be appreciated that the method 200 may be implemented at the terminal device 110 and/or the network device 120. Only for the purpose of illustrations, the following descriptions describe embodiments where the method is implemented at the terminal device 110.

At block 210, the terminal device 110 determines a power (referred to as "a first power" hereinafter) for transmitting a signal to a further communication device. In some embodiments, the further communication may be another terminal device, for example, the terminal device 110-2. In other embodiments, the further communication device may be the network device 120. For the purpose of illustrations, the further communication device may refer to the network device 120 in the following description. In example embodiments, the signal may carry an initial message and/or a preamble.

In an example embodiment, the terminal device 110 may determine the first power based on loss of a path between itself and the network device 120 (also referred to as "path loss" hereafter). For example, the terminal device 110 may estimate the path loss according to transmitting environments. In some embodiments, the terminal device 110 may compare previously received signals 120 with a reference signal to estimate the path loss. In other embodiments, the terminal device 110 may determine the first power based on signal strength information from the network device 120.

In some embodiments, the terminal device 110 may determine the equivalent isotopically radiated power (EIRP) as the first power for transmitting. In a further embodiment, the terminal device 110 may determine the first power based on information about previous transmission(s). For example, the terminal device 110 may transmit the signal at a certain power level before but may not receive any information indicating that the transmission is successful. In this case, the terminal device 110 may determine that the certain power is not strong enough and thus increases the power.

At block 220, the terminal device 110 determines a mode of an antenna of the terminal device 110 based on the first power and a threshold power. The mode of the antenna may comprise an omnidirectional mode and/or a directional mode. In some embodiments, the terminal device 110 may support multiple modes for transmission, for example, the omnidirectional mode and the directional mode.

The threshold power is predefined for the omnidirectional mode of the antenna. For example, the threshold power may be the maximum power that the antenna in the omnidirectional mode can achieve. In a further embodiment, the threshold power may be the maximum power of the omnidirectional mode that does not cause strong reference to other communications in the communication system 100. If the threshold power can be achieved by the omnidirectional mode, it often can also be achieved by the directional mode. The threshold power may be stored in a local storage of the terminal device 110. The threshold power may be stored in a remote storage which can be accessed by the terminal device 110. As described above, the omnidirectional mode may comprise the full-omnidirectional mode and the semi-omnidirectional mode. For example, the semi-omnidirectional mode may have an antenna angle which less than 360 degrees but more than the angle of a directional mode, such as 120 degrees. For the purpose of illustrations, embodiments of the present disclosure are described with reference to the full-omnidirectional mode. It should be appreciated that embodiments can be implemented with the full-omnidirectional mode or the semi-omnidirectional mode.

In some embodiments, if the first power is below the threshold power, the terminal device 110 may determine the mode of the antenna to be the omnidirectional mode. That is, if the first power can be achieved by both the omnidirectional mode and the directional mode, the terminal device 110 prefers the omnidirectional mode. In this way, the terminal device does not need to determine the direction for transmission, thereby reducing the latency of connection.

If the first power exceeds the threshold power, the terminal device 110 may determine the mode to be the directional mode. As described above, if the first power exceeds the threshold power, it means that the omnidirectional mode cannot achieve the first power. That is, the terminal device 110 may choose the directional mode if the first power is too high to be achieved by the omnidirectional mode. In this way, the terminal device 110 may achieve switching between the omnidirectional mode and the directional mode, thereby improving the efficiency of connecting to the network device 120 successfully.

At block 230, the terminal device 110 transmits the signal via the antenna in the determined mode using the first power. Embodiments of the present disclosure are described with reference to FIGS. 3A-3C which are schematic diagrams illustrating transmission schemes.

Figure 3A:
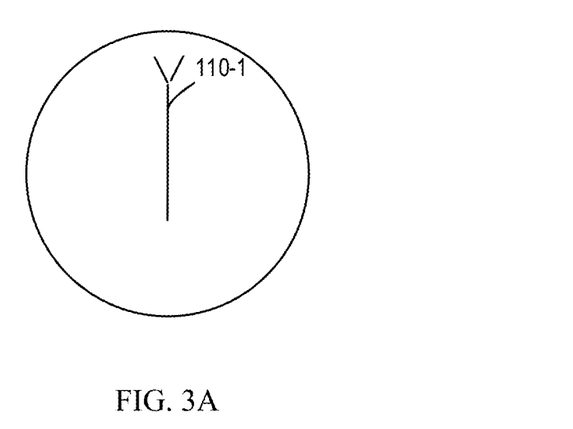
FIGS. 3A-3C are schematic diagrams illustrating transmission schemes according to embodiments of the present disclosure.

If the terminal device 110 determines the mode to be the omnidirectional mode, the terminal device 110 may transmit the signal to the network device 120 via the antenna in the omnidirectional mode using the first power. As shown in FIG. 3A, the terminal device 110 transmit the signal in all directions at the same power, for example, the first power.

In some embodiments, if the terminal device 110 does not receive a feedback from the network device 120, the terminal device 110 may increase the first power by a certain amount to a second power. In an example embodiment, the feedback may be an acknowledgement (ACK) or a negative acknowledgment (NACK). It is to be understood that this example is illustrated for discussion, rather than limitation. In embodiments of the present disclosure, the feedback may be any information to indicate whether the network device 120 has received the signal. The certain amount may be predetermined and stored in a storage accessed by the terminal device 110. The terminal device 110 may determine the second power randomly. In some embodiments, if the second power does not exceed the threshold power, the terminal device 110 may retransmit the signal to the network device 120 in the omnidirectional mode using the second power. In other embodiments, if the second power exceeds the threshold power, the terminal device 110 may retransmit the signal to the network device 120 in the directional mode using the second power.

Figure 3B:
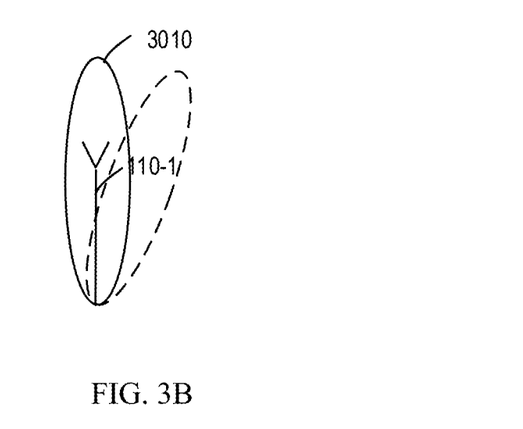

If the terminal device 110 determines the mode to be the directional mode, the terminal device 110 may determine a direction (referred to as "a first direction" hereinafter) for transmitting the signal and transmit the signal in the directional mode in the first direction. The direction may be determined based on signals received from the network device 120. As shown in FIG. 3B, the terminal device 120 may determine the direction 3010 as the first direction.

For example, the network device 120 may transmit several synchronization signal blocks (SS-blocks) to the terminal device 110 at different directions. The SS-block may include a primary synchronization signal (PSS) and/or a secondary synchronization signal (SSS). Alternatively, or in addition, the SS-block may include remaining minimum system information (RMSI). The SS-block may also include a physical broadcasting channel (PRCH). The SS-block corresponds to a physical random access channel (PRACH) resource. The PRACH resource may be indicated in the RMSI carried in the SS-block.

In some embodiments, the terminal device 110 may receive one or more SS-blocks from the network device 120. The terminal device 110 may determine different directions based on different SS-blocks. The terminal device 110 may also estimate the path loss based on the SS-block. If the terminal device 110 receives more than one SS-block, the terminal device 110 may select one therefrom to determine the direction in any suitable manners. For example, the terminal device 110 may select the SS-block with the strongest strength. The terminal device 110 may also select the SS-block with the least path loss.

In an example embodiment, if the terminal device 110 does not receive a feedback from the network device 120, the terminal device 110 may increase the first power to a third power. As described above, the feedback may be any suitable information indicating the network device 120 has receives the signal. The terminal device 110 may retransmit the signal without changing the direction. That is to say, the terminal device 110 may retransmit the signal in the same direction using the third power.

Figure 3C:
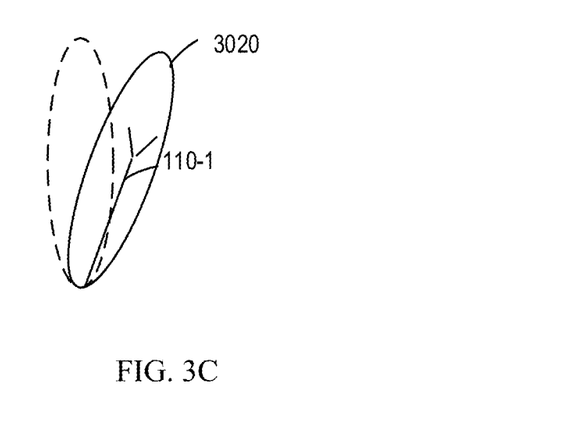

Alternatively, or in addition, if the terminal device 110 does not receive a feedback from the network device 120, the terminal device 110 may determine a further direction (referred to as "a second direction") for retransmitting the signal. As shown in FIG. 3C, the terminal device 110 may determine the direction 3020 as the second direction. For example, the terminal device 110 may select a further SS-block different from the one used to determine the first direction. In some embodiments, the terminal device 110 may determine the second direction based on the signal strength of the receive SS-block. It should be appreciated that the further SS-block may be selected in any suitable manners. For example, the further SS-block may have a second strongest strength. The terminal device 110 may retransmit the signal in the second direction using the first power, or another suitable power different from the first power.

In this way, the terminal device 110 may switch from the omnidirectional mode to the directional mode smoothly, thereby guaranteeing the connection to the network device 120 in high path-loss conditions. Further, according to embodiments of the present disclosure, if the path between the terminal device 110 and the network device 120 has a relatively low loss, the terminal device 110 may connect to the network device 120 via the antenna which is in the omnidirectional mode, which significantly reducing the latency due to adjusting transmitting directions. In addition, according to embodiments of the present disclosure, if the path between the terminal device 110 and the network device 120 has a relatively high loss, the terminal device 110 may connect to the network device 120 via the antenna in the directional mode, which guarantees successful connections between the terminal device and the network device.

Figure 4:
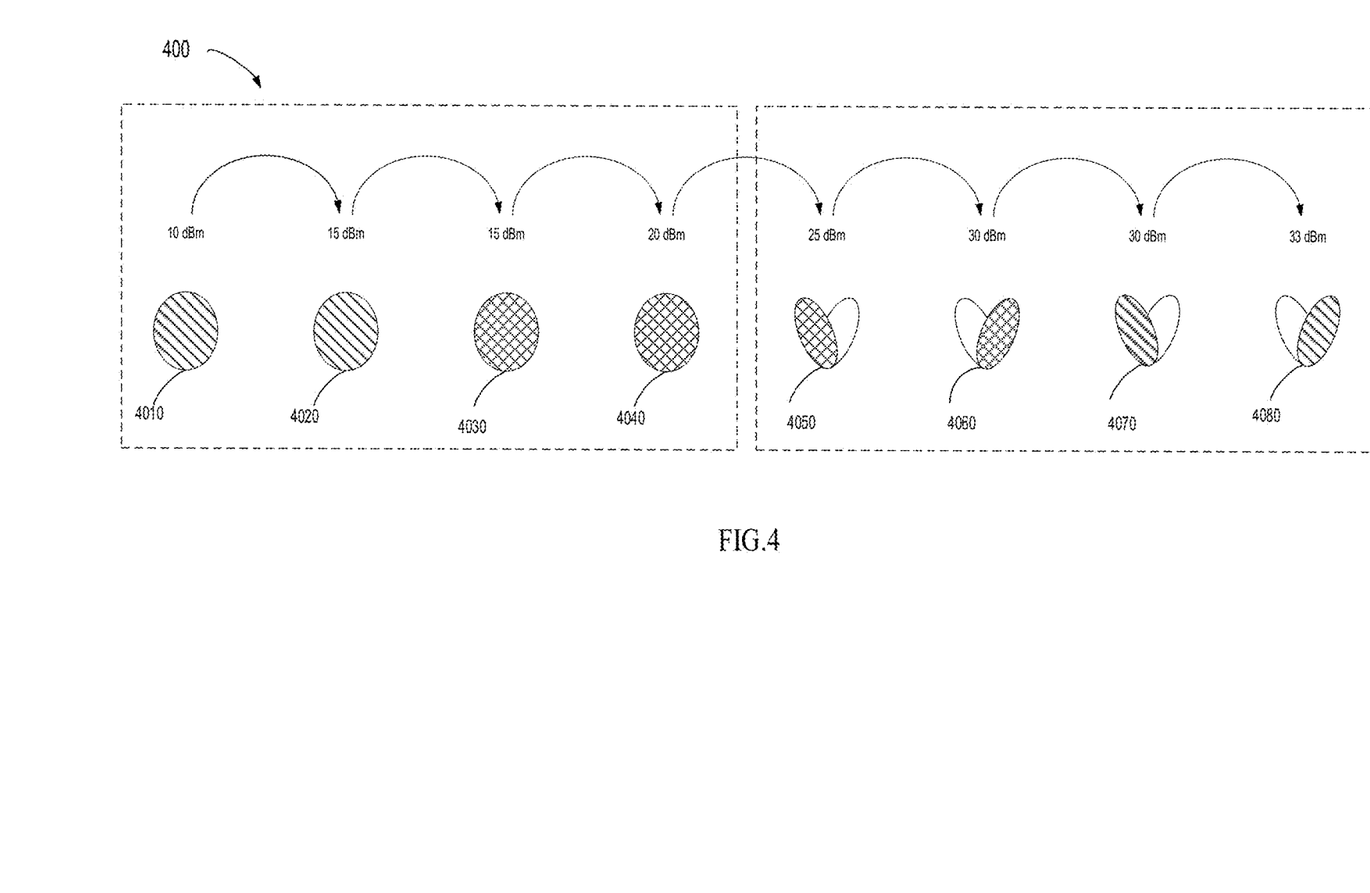
FIG. 4 illustrates a schematic diagram of transmission schemes according to one embodiment of the present disclosure.

FIG. 4 illustrates a schematic diagram of transmission schemes according to one embodiment of the present disclosure. It should be appreciated that embodiment shown in FIG. 4 is only for the purpose of illustrations and does not intend to suggest any limitation.

The terminal device 110 receives one or more SS-blocks from the network device 120. The SS-blocks may be presented as SS-block-1, SS-block-2, ... SS-block-M, where M is any suitable integer number. Each SS-block corresponds to different PRACH resources. The terminal device 110 may select SS-blcok-1 from the plurality SS-blocks. The terminal device 110 may determine the first power to be 10 dBm for the initial transmission 4010 based on the SS-block-1. In this example, the threshold power is for the omnidirectional mode of the antenna is 20 dBm. Since the first power is below the threshold power, the terminal device 110 transmits the signal via the antenna in the omnidirectional mode using the PRACH corresponding to the SS-block-1. That is, the terminal device 110 transmits the signal at the power level of 10 dBm for all directions.

If the terminal device 110 receives a feedback within a predetermined period of time, the terminal device 110 connects to the network device 120 successfully. If the terminal device 110 does not receive the feedback to the initial transmission 4010, the terminal device 110 may increase the power from 10 dBm to 15 dBm. Since the 15 dBm is still below the threshold power, the terminal device 110 performs the retransmission 4020 via the antenna in the omnidirectional mode using the PRACH corresponding to the SS-block-1 at the power level of 15 dBm.

If the terminal device 110 does not receive the feedback to the retransmission 4020, the terminal device 110 may select the SS-block-2 and performs a retransmission 4030 via the antenna in the omnidirectional mode using the PRACH corresponding to the SS-block-2 at the power level of 15 dBm. In other embodiments, the terminal device 110 may retransmit the signal with a further increased power (for example, 20 dBm) using the PRACH corresponding to the SS-block-1.

If the terminal device 110 still does not receive the feedback to the retransmission 4030, the terminal device increases the power from 15 dBm to 20 dBm and performs a retransmission 4040 via the antenna in the omnidirectional mode using the PRACH corresponding to the SS-block-2 at the power level of 20 dBm.

The initial transmission 4010 and the retransmissions 4020, 4030 and 4040 are performed via the antenna in the omnidirectional mode. If the terminal device 110 still does not receive a feedback to the retransmission 4040, the terminal device 110 may further increase the power from 20 dBm to 25 dBm. At this point, the power 25 dBm exceeds the threshold power, and the terminal device 110 may switch the antenna from the omnidirectional mode to the directional mode.

The terminal device 110 may determine a first direction for transmission based on the SS-block-2 and performs a retransmission 4050 via the antenna in the directional mode at the first direction using the PRACH resource corresponding to the SS-bloc-2 at the power level of 25 dBm. If the terminal device 110 still does not receive a feedback to the retransmission 4050, the terminal device 110 may increase the power from 25 dBm to 30 dBm and performs a retransmission 4060 via the antenna in the directional mode at the second direction using the PRACH resource corresponding to the SS-bloc-2 at the power level of 30 dBm.

If the terminal device 110 still does not receive a feedback to the retransmission 4060, the terminal device 110 may select the SS-block-3 and determines a second direction for transmission. The terminal device 110 performs a retransmission 4070 via the antenna in the directional mode at the second direction using the PRACH resource corresponding to SS-block-3 at the power level of 30 dBm. In some embodiments, the terminal device 110 may perform the retransmission 4070 via the antenna in the directional mode at the second direction using the PRACH resource corresponding to SS-block-2 at the power level of 30 dBm. That is to say, the terminal device 110 may retransmit the signal in the second direction without changing the PRACH resource.

If the terminal device 110 still does not receive a feedback to the retransmission 4070, the terminal device 110 may increase the power from 30 dBm to 33 dBm and determines a third direction for transmission. The terminal device 110 performs a retransmission 4080 the signal via the antenna in the directional mode at the third direction using the PRACH resource corresponding to SS-block-3 at the power level of 33 dBm.

Figure 5:
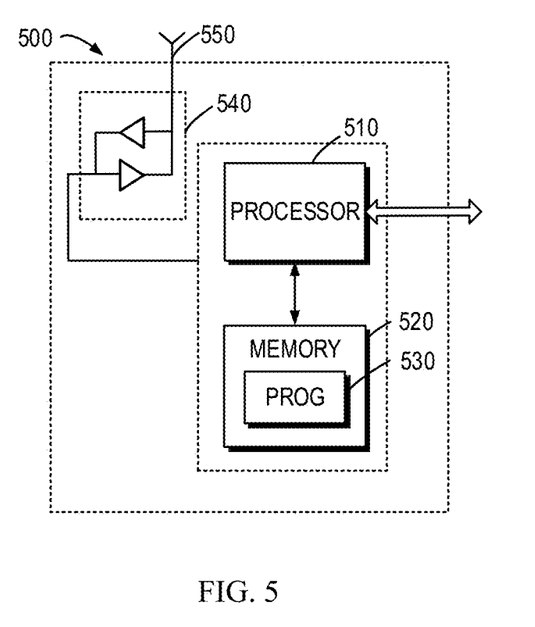
FIG. 5 illustrates a schematic diagram of a device according to embodiments of the present disclosure.

FIG. 5 is a simplified block diagram of a device 500 that is suitable for implementing embodiments of the present disclosure. The device 500 may be implemented at the terminal device 110. The device 500 may also be implemented at the network device 120. As shown, the device 110 comprises one or more processors 510, one or more memories 520 coupled to the processor(s) 510, one or more transmitters and/or receivers (TX/RX) 540 coupled to the processor 510.

The processor 510 may be of any type suitable to the local technical network, and may comprise one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 520 stores at least a part of a program 530. The TX/RX 540 is for bidirectional communications. The TX/RX 540 has at least one antenna 550 to facilitate communication, though in practice an Access Node mentioned in this application may have several ones. The communication interface may represent any interface that is necessary for communication with other network elements.

The program 530 is assumed to comprise program instructions that, when executed by the associated processor 510, enable the device 500 to operate in accordance with the embodiments of the present disclosure, as discussed herein with reference to FIGS. 2 to 4. That is, embodiments of the present disclosure can be implemented by computer software executable by the processor 510 of the device 500, or by hardware, or by a combination of software and hardware.

In the context of the present disclosure, the computer program code or related data may be carried by any suitable carrier to enable the device, apparatus, or processor to perform the various processes and operations described above. Examples of carriers include signals, computer readable media and the like.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be comprised within the scope of the appended claims. Although specific terms are used herein, they are used in a generic and descriptive sense only and not for purpose of limitation.

What is claimed is:

1. A method implemented at a first communication device, comprising:
   receiving, at the first communication device, a plurality of synchronization signal (SS)-blocks from a second communication device;
   determining a path loss between the first communication device and the second communication device for each of the plurality of SS-blocks based on the plurality of SS-blocks received by the first communication device from the second communication device;
   determining a first power for transmitting a signal to the second communication device based on the determined path loss of one of the plurality of SS-blocks;
   determining, based on the first power and a threshold power, a mode of an antenna of the first communication device from as an omnidirectional mode and a directional mode, the threshold power being predefined for the omnidirectional mode of the antenna; and
   transmitting, to the second communication device, the signal via the antenna in the determined mode using the first power.

2. The method of claim 1, wherein determining the mode of the antenna comprises:
   in response to the first power being below the threshold power, determining the mode of the antenna to be the omnidirectional mode; and
   in response to the first power exceeding the threshold power, determining the mode of the antenna to be the directional mode.

3. The method of claim 1, further comprising:
   in response to failing to receive, from the second communication device, a first feedback to the signal, increasing the first power to a second power; and
   retransmitting, to the second communication device, the signal via the antenna in the determined mode using the second power.

4. The method of claim 1, wherein transmitting the signal via the antenna in the determined mode comprises:
   in response to the determined mode being the directional mode, determining, based on a first synchronization signal received from the second communication device, a first direction for transmitting the signal; and
   transmitting, in the first direction, the signal via the antenna in the directional mode using the first power.

5. The method of claim 4, further comprising:
   in response to failing to receive a second feedback to the signal, increasing the first power to a third power; and
   retransmitting, in the first direction, the signal by the antenna in the directional mode using the third power.

6. The method of claim 4, further comprising:
   in response to failing to receive a third feedback to the signal retransmitted in the first direction, determining a second direction based on a second synchronization signal received from the second communication device; and
   retransmitting, in the second direction, the signal via the antenna in the directional mode using the first power.

7. A non-transitory computer readable medium storing instructions thereon, the instructions, when executed by at least one processing unit of a machine, causing the machine to perform the method according to claim 1.

8. The method of claim 1 wherein the received signal from the further communication device is compared to a reference signal to determine the path loss.

9. The method of claim 1, further comprising:
selecting the one of the plurality of SS-blocks for determining the first power based on the respective path losses of the plurality of SS-blocks.

10. A first communication device, comprising:
an antenna;
at least one processor; and
a memory coupled to the at least one processor, the memory storing instructions therein, the instructions, when executed by the at least one processor, causing the first communication device to perform acts including:
receiving, at the first communication device, a plurality of SS-blocks from a second communication device;
determining a path loss between the first communication device and the second communication device for each of the plurality of SS-Blocks based on the plurality of SS-blocks received by the first communication device from the second communication device;
determining a first power for transmitting a signal to the second communication device based on the determined path loss of one of the plurality of SS-blocks;
determining, based on the first power and a threshold power, a mode of the antenna of the first communication device from an omnidirectional mode and a directional mode, the threshold power being predefined for the omnidirectional mode of the antenna; and
transmitting, to the second communication device, the signal via the antenna in the determined mode using the first power.

11. The first communication device of claim 10, wherein determining the mode of the antenna comprises:
in response to the first power being below the threshold power, determining the mode of the antenna to be the omnidirectional mode; and
in response to the first power exceeding the threshold power, determining the mode of the antenna to be the directional mode.

12. The first communication device of claim 10, wherein the acts further comprise:
in response to failing to receive, from the second communication device, a first feedback to the signal, increasing the first power to a second power; and
retransmitting, to the second communication device, the signal via the antenna in the determined mode using the second power.

13. The first communication device of claim 10, wherein transmitting the signal via the antenna in the determined mode comprises:
in response to the determined mode being the directional mode, determining, based on a first synchronization signal received from the second communication device, a first direction for retransmitting the signal; and
transmitting, in the first direction, the signal via the antenna in the directional mode using the first power.

14. The first communication device of claim 13, wherein the acts further comprise:
in response to failing to receive a second feedback to the signal, increasing the first power to a third power; and
retransmitting, in the first direction, the signal by the antenna in the directional mode using the third power.

15. The first communication device of claim 13, wherein the acts further comprise:
in response to failing to receive a third feedback to the signal retransmitted in the first direction, determining a second direction based on a second synchronization signal received from the second communication device; and
retransmitting, in the second direction, the signal via the antenna in the directional mode using the first power.

16. The first communication device of claim 10 wherein the received signal from the further communication device is compared to a reference signal to determine the path loss.

17. The first communication device of claim 10, wherein the one of the plurality of SS-blocks is selected for determining the first power based on the respective path losses of the plurality of SS-blocks.

* * * * *

UNITED STATES PATENT AND TRADEMARK OFFICE
CERTIFICATE OF CORRECTION

| | | |
|---|---|---|
| PATENT NO. | : 11,490,340 B2 | Page 1 of 1 |
| APPLICATION NO. | : 16/969039 | |
| DATED | : November 1, 2022 | |
| INVENTOR(S) | : Zhe Luo et al. | |

It is certified that error appears in the above-identified patent and that said Letters Patent is hereby corrected as shown below:

On the Title Page

Item (56) (OTHER PUBLICATIONS) should read:
Examination Report dated Dec. 6, 2021 in Indian Application No. 202047044007.

Signed and Sealed this
Fifteenth Day of August, 2023

Katherine Kelly Vidal
*Director of the United States Patent and Trademark Office*